United States Patent [19]

Kröck et al.

[11] 4,294,769
[45] Oct. 13, 1981

[54] PROCESS FOR THE PREPARATION OF 1,4-DIAMINO-2,3-DICYANO-ANTHRAQUINONES

[75] Inventors: Friedrich W. Kröck, Cologne; Rütger Neeff; Heinz Scheiter, both of Leverkusen, all of Fed. Rep. of Germany

[73] Assignee: Bayer Aktiengesellschaft, Leverkusen, Fed. Rep. of Germany

[21] Appl. No.: 171,870

[22] Filed: Jul. 24, 1980

[30] Foreign Application Priority Data

Aug. 7, 1979 [DE] Fed. Rep. of Germany ....... 2931981
Feb. 1, 1980 [DE] Fed. Rep. of Germany ....... 3003657

[51] Int. Cl.³ .............................................. C07C 97/12
[52] U.S. Cl. ..................................................... 260/378
[58] Field of Search ......................................... 260/378

[56] References Cited

U.S. PATENT DOCUMENTS 1,938,029 12/1933 Kugel .................................... 260/348
4,042,605 8/1977 Hartwig .............................. 260/348

FOREIGN PATENT DOCUMENTS 1906834 9/1969 Fed. Rep. of Germany .

Primary Examiner—Winston A. Douglas
Assistant Examiner—Raymond K. Covington
Attorney, Agent, or Firm—Sprung, Felfe, Horn, Lynch & Kramer

[57] ABSTRACT

2,3-Dicyano-anthraquinones of the formula

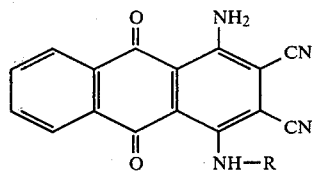

wherein
R denotes hydrogen, alkyl or cycloalkyl, are obtained in good yields and high purity by reacting compounds of the formula

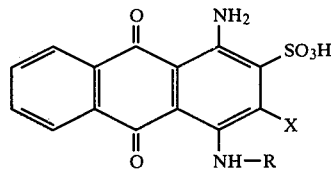

wherein
X denoted hydrogen or the sulphonic acid group, with cyanides in formamide or N-methylformamide as solvents, and if appropriate oxidizing agents and heavy metal catalysts.

10 Claims, No Drawings

PROCESS FOR THE PREPARATION OF 1,4-DIAMINO-2,3-DICYANO-ANTHRAQUINONES

The invention relates to a process for the preparation of compounds of the formula

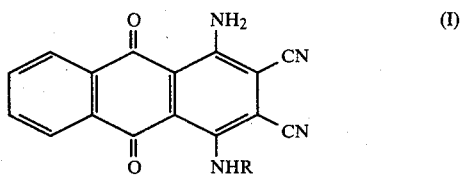

wherein
R is hydrogen or an optionally substituted alkyl or cycloalkyl radical,
by reacting corresponding 1,4-diamino-anthraquinone-2(3)-sulphonic acids or salts thereof with compounds which donate cyanide ions.

This synthesis principle has been known for many years (compare U.S. Pat. No. 1,938,029 and U.S. Pat. No. 3,893,801), and since it was first known many improvements have been made, the reaction being carried out in the presence of air or other oxidising agents and/or heavy metal catalysts (compare British Patent Specification No. 1,212,846, British Patent Specification No. 901,059 and Soviet Union Patent No. 148,066).

However, even these improved processes were not completely satisfactory. When the processes were repeated following the instructions given, the high yields claimed for the pure dinitriles of the formula I could never be achieved. Reaction products which contain relatively large amounts of "mononitriles" were always obtained as a result of incomplete replacement reactions or reactions in which the products were partly split again (compare Houben-Weyl, Volume 7, part 3c, page 239). It is not particularly simple, at least on an industrial scale, to separate off these by-products.

According to U.S. Pat. No. 4,042,605 (corresponding to German Offenlegungsschrift 2,524,748), the reaction in which sulphonic acid is replaced by cyanide and which is utilised according to the invention is said to have the disadvantage that the 1-aminoanthraquinone required as the starting material for this process and thus the $\beta$-sulphonic acids prepared therefrom are only accessible by a sulphonation reaction catalysed by mercury, so that the title compounds are accordingly better prepared from optionally $\beta$-halogenated 1,4-diamino-anthraquinones in the presence of aprotic solvents.

Apart from the fact that even this process variant, when repeated, gave only moderate to average yields of products containing at most 50% of dinitrile of the formula I, the objection to using the $\beta$-sulphonic acids as starting materials for the replacement by its cyanide is unfounded, since methods which enable the mercury to be separated off virtually completely have in the meantime been developed, and also in the meantime, synthesis routes for the preparation of 1-amino-anthraquinone without using mercury (for example starting from 1-nitro-anthraquinone) have reached the industrial stage.

The object of the present invention was thus to prepare the compounds of the formula I in high yields and in particular high purity starting from $\beta$-sulphonic acids, which are now readily accessible.

According to the invention, this object is achieved by a procedure in which the reaction of the $\beta$-sulphonic acids with compounds which donate cyanide ions is carried out in formamide or N-methyl-formamide, preferably in the presence of an oxidising agent and if appropriate in the presence of acid-binding agents. Preferably formamide is used.

It is to be described as exceptionally surprising that the reaction proceeds so smoothly in the solvents to be used according to the invention, since in other solvents which are usually employed in industry, such as, for example, water, dimethylformamide, N-methylpyrrolidone, dimethylsulphoxide, sulpholane, pyridine, ethylene glycol, diethylene glycol, dimethylacetamide, tetramethylurea and the like, the yields under comparable reaction conditions are considerably lower.

The amount of solvents to be employed according to the invention can vary within a substantial range, and depends essentially on the solubility of the reactants. A readily stirrable system in which the starting materials are preferably completely dissolved should in any case be formed.

In general, 1–5 kg of solvent are required per mol of $\beta$-sulphonic acid.

The $\beta$-sulphonic acids and salts thereof are known, or are readily accessible by methods which are known per se.

Suitable $\beta$-sulphonic acids are 1,4-diaminoanthraquinone-2-sulphonic acid, 1,4-diamino-anthraquinone-2,3-disulphonic acid and derivatives thereof which are substituted by the radical R in the amino group in the 4-position.

Suitable radicals R are: $C_1$–$C_6$-alkyl, $C_1$–$C_4$-alkoxy-$C_2$–$C_5$-alkyl, which can additionally be substituted in the alkoxy group by a hydroxyl group, and cyclohexyl, which can be substituted by one to three $C_1$–$C_3$-alkyl radicals. R preferably represents H or $C_1$–$C_6$-alkyl.

1,4-Diamino-anthraquinone-2-sulphonic acid, which, for example, can be obtained in an economical manner from 1-amino-anthraquinone (without pollution problems since no mercury as catalyst is used) by sulphonation, bromination and replacement of bromine by amino, is particularly preferred.

Both the free acid and its salts with various metals, in particular with alkali metals, as well as its ammonium salts, are suitable for carrying out the process according to the invention.

Suitable oxidising agents are those inorganic oxidising agents, such as air, oxygen, nitrites, nitrates, manganese dioxide, sodium chlorite, potassium bromate, ammonium persulphate and potassium persulphate and hydrogen peroxide and its addition compounds, such as sodium percarbonate, sodium perborate and sodium perpyrophosphate, and organic oxidising agents, such as, for example, peracetic acid, the addition compound of urea and hydrogen peroxide, nitrobenzene, m-nitrobenzoic acid and salts thereof and m-nitrobenzenesulphonic acid and salts thereof. It is preferable to use nitrobenzene, m-nitro-benzenesulphonic acid and salts thereof and oxygen, advantageously in the form of atmospheric oxygen, if appropriate in the presence of compounds having a catalytic action, such as ammonium molybdate, ammonium vanadate or copper compounds, for example copper acetate.

The reaction temperatures can also vary within a substantial range, that is to say between 40° and 200° C. The reaction is in general carried out in the temperature range customary for this synthesis principle, that is to say between 60° and 120° C.

It is expedient to use between 0.2 and 2 mols of nitrobenzene or m-nitro-benzenesulphonic acid, if appropriate in the form of one of its salts, per one mol of the 1,4-diamino-anthraquinone-2-sulphonic acid or 2,3-disulphonic acid to be reacted. The amount of the other oxidising agents is chosen according to their Redox equivalents. An amount of oxidising agent less than the calculated amount is to be avoided, because of the formation of by-products, as is a relatively large excess, because of interaction of the oxidising agent with the cyanide ions (compare British Patent Specification No. 901,059). In contrast to the statements in that patent, which relate to aqueous reaction media, it is, however, not necessary to meter in the oxidising agent during the reaction when formamide or N-methylformamide is used; the optimum amount, to be established by experiments can be added at the start.

Acid-binding agents which are particularly suitable are: alkali metal salts and alkaline earth metal salts of weak acids, such as, for example, sodium carbonate, sodium bicarbonate, potassium carbonate, sodium acetate, potassium acetate, magnesium carbonate and calcium carbonate, and also ammonium carbonate and bicarbonate. The amount thereof to be employed is mainly determined by the form in which the 1,4-diamino-anthraquinone-sulphonic acid is used. If the free acid is used as the starting material or if free hydrocyanic acid is used as the compound which donates cyanide ions, it is expedient to add at least the equivalent amount of an acid-binding agent. An excess of acid-binding agent does not have an adverse effect on the reaction.

Suitable compounds which donate cyanide ions are, in particular, alkali metal cyanides and alkaline earth metal cyanides, such as sodium cyanide, potassium cyanide or magnesium cyanide, and also ammonium cyanide, zinc cyanide, copper-I cyanide, complex copper and zinc cyanides, hydrocyanic acid, cyanohydrins of aldehydes and ketones and many others. Sodium cyanide and potassium cyanide are preferred. The amount of compound which donates cyanide ions is chosen such that at least 2 mols, advantageously 2.5 to 10 mols, are employed per 1 mol of the 1,4-diamino-anthraquinone-2-sulphonic acid or -2,3-disulphonic acid or salts thereof.

The reaction has ended when the thin layer chromatogram indicates that the starting material has reacted without trace. This is in general the case after 2–20 hours, the time depending on the β-sulphonic acid to be reacted. If the preferred 1,4-diamino-anthraquinone-2-sulphonic acid is used, the reaction has in general ended after 4 hours.

Working up of the reaction mixture is very simple, since the dinitrile of the formula I is as a rule more sparingly soluble than the starting materials and can thus easily be isolated by filtration.

The solvent can be recovered from the filtrate by simple distillation, which means that not only is the process economical, but effluent problems are also avoided. The reaction products are obtained directly in high purity (less than 3% of "mononitrile"), which is highly significant for their use as dyestuffs or starting materials for the preparation of valuable dyestuffs (compare U.S. Pat. Nos. 2,628,963 and 3,203,751), since relatively high contents of "mononitrile" shift the brilliant greenish-tinged blue colour shade to less desirable reddish-tinged shades.

A further advantage of the new preparation process for these products is that the use of formamide or N-methylformamide as the solvent permits the amount of solvent to be reduced to such an extent that the space/time yield can be increased about ten-fold, compared with the known processes in which water is used as the solvent.

The present invention also relates to new 1,4-diamino-2,3-dicyanoanthraquinones of the formula (I) in which R represents an optionally substituted cycloalkyl radical, preferably a cyclohexyl radical which is optionally substituted by 1–3 methyl groups.

EXAMPLE 1

A mixture of 202.8 g of 78.4% pure 1,4-diaminoanthraquinone-2-sulphonic acid (containing salts), 41 g of dry sodium acetate, 112.5 g of dry sodium 3-nitrobenzenesulphonate, 73.5 g of sodium cyanide and 1,200 ccs of formamide is heated to 80°–85° C., whilst stirring, until the starting material can no longer be detected by thin layer chromatography (TLC), that is to say for about 3.5–4 hours. The reaction mixture is filtered off whilst still warm and the filter cake is rinsed once in the cold with 100 ccs of formamide and then washed with hot water until the runnings are colourless. After drying at 60° C., 144 g of a dark blue, crystalline product which, according to analysis, contains 91.4% of 1,4-diamino-2,3-dicyano-anthraquinone and 1.9% of 1,4-diamino-2-cyano-anthraquinone, are obtained. This corresponds to a yield of 91.4% of pure dinitrile. The formamide can be recovered from the mother liquor by distillation under a waterpump vacuum and can then be employed again for the reaction.

Instead of sodium acetate, the following compounds can equally successfully be employed in the reaction: 84 g of sodium bicarbonate, 53 g of sodium carbonate, 5 g of calcium carbonate, 69 g of potassium carbonate, 49 g of potassium acetate or 20 g of magnesium oxide.

EXAMPLE 2

A mixture of 189.1 g of 84.1% strength 1,4-diamino-anthraquinone-2-sulphonic acid, 56.3 g of dry sodium 3-nitrobenzenesulphonate, 73.5 g of sodium cyanide and 1,200 ccs of formamide is heated to 90° C., whilst stirring, until the starting material can no longer be detected by TLC, that is to say for about 4 hours. The reaction mixture is filtered off whilst still warm and the filter cake is washed and dried as in Example 1. Yield: 142 g of a dark blue, crystalline product which, according to analysis, contains 92.1% of 1,4-diamino-2-dicyano-anthraquinone and 2.3% of 1,4-diamino-2-cyano-anthraquinone. This corresponds to a yield of 90.8% of pure dinitrile.

Instead of sodium cyanide, the following compounds which donate cyanide ions can also be employed with similar success: 97.5 g of potassium cyanide, 37.8 g of magnesium cyanide, 68.6 g of zinc cyanide or 66 g of ammonium cyanide.

EXAMPLE 3

A mixture of 170.6 g of 93.2% pure 1,4-diamino-anthraquinone-2-sulphonic acid, 41 g of dry sodium acetate, 62 g of nitrobenzene, 73.5 g of sodium cyanide and 1,200 ccs of formamide is heated to 90° C., whilst stirring, until the starting material can no longer be detected by TLC, that is to say for about 3.5 hours. The reaction mixture is filtered off whilst still warm and the filter cake is washed and dried as in Example 1. Yield:

140 g of a dark blue, crystalline product which, according to analysis, contains 90.3% of 1,4-diamino-2,3-dicyano-anthraquinone and 1.6% of 1,4-diamino-2-cyano-anthraquinone. This corresponds to a yield of 87.8% of pure dinitrile.

Instead of the nitrobenzene, the following oxidising agents can also be employed with similar success: 83.5 g of sodium 3-nitrobenzenecarboxylate, 35 g of sodium nitrite or 43 g of sodium nitrate. Similar results are also obtained if the following oxidising agents are employed: manganese dioxide, sodium chlorite, potassium bromate, ammonium persulphate, potassium persulphate, hydrogen peroxide, sodium percarbonate, sodium perborate, sodium perpyrophosphate, peracetic acid or the addition compound of urea and hydrogen peroxide.

EXAMPLE 4

A mixture of 31.8 g of 93.9% pure 1,4-diamino-anthraquinone-2-sulphonic acid, 240 ccs of formamide, 14.7 g of sodium cyanide, 8.2 g of dry sodium acetate and 0.68 g of ammonium vanadate is heated to 80° C., whilst passing through 6.4 l/hour of air, until the starting material has reacted completely (for about 2.5 hours). The reaction mixture is worked up as described in the preceding examples and 24.0 g of a dark blue, crystalline product which, according to analysis, contains 90.9% of 1,4-diamino-2,3-dicyano-anthraquinone and 0.9% of 1,4-diamino-2-cyano-anthraquinone are obtained. This corresponds to a yield of 80.6% of pure dinitrile.

Instead of air, an appropriately weaker stream of oxygen can also equally successfully be passed through the mixture, or instead of ammonium vanadate, 0.68 g of ammonium molybdate or 1.0 g of copper acetate can also be employed as the catalyst.

EXAMPLE 5

A mixture of 211 g of sodium 1,4-diamino-anthraquinone-2,3-disulphonate, 73.5 g of sodium cyanide, 82 g of dry sodium acetate and 1,200 ccs of formamide is heated to 50° C. until the disulphonic acid has reacted completely (for about 3 hours). The product which has crystallised out is filtered off whilst still warm, washed with hot water until the runnings are colourless and dried at 60° C. Yield: 127 g of a dark blue, crystalline product which, according to analysis, contains 95.2% of 1,4-diamino-2,3-dicyano-anthraquinone and no mononitrile. This corresponds to a yield of 87.9% of pure dinitrile.

EXAMPLE 6

A mixture of 174 g of 91.2 percent pure 1,4-diamino-anthraquinone-2-sulphonic acid (as the Na salt), 1,200 ccs of N-methyl-formamide, 63.7 g of sodium cyanide, 62.0 g of nitrobenzene and 41 g of sodium acetate is heated to 80°-85° C., whilst stirring, until, according to the TLC, the starting material has reacted without trace, that is to say for about 8 hours. The reaction mixture is worked up as described in Example 1. After drying, 133 g of a dark blue, crystalline product which, according to analysis, contains 85.5% of 1,4-diamino-2,3-dicyano-anthraquinone and no 1,4-diamino-2-cyanoanthraquinone are obtained. This corresponds to a yield of 78.9% of the pure product.

EXAMPLE 7

A mixture of 2 g of dry sodium carbonate, 75 ccs of formamide and 2.3 g of glacial acetic acid is stirred, and 6.25 g of ammonium bicarbonate, 12.7 g of dry sodium 3-nitrobenzenesulphonate, 8.25 g of sodium cyanide and 10 g of sodium 1-amino-4-cyclohexylamino-anthraquinone-2-sulphonate are added. The mixture is heated to 80° C., a further 7.5 g of glacial acetic acid are added dropwise in the course of about 1 hour and stirring is then continued at 80°-85° C. until the starting material has reacted without trace (for about 5 to 6 hours). The dyestuff which has precipitated is filtered off, after cooling, and washed with hot water until the runnings are colourless and dried at 60° C. Yield: 8.4 g of dark blue crystals, corresponding to 95.8% of theory. As the mass spectrum and the thin layer chromatogram show, the product is mainly 1-amino-4-cyclohexylamino-2,3-dicyano-anthraquinone with a molecular weight of 370. Nitrogen content: calculated: 15.12%, found: 14.9/15.0%.

EXAMPLE 8

By a procedure corresponding exactly to that in Example 7, 7.8 g of dark blue crystals, corresponding to 90.2% of theory, are formed from 10 g of sodium 1-amino-4-isopropylamino-anthraquinone-2-sulphonate (prepared from isopropylamine and 1-amino-4-bromo-anthraquinone-2-sulphonic acid). Nitrogen content of the product: calculated: 16.96%, found 17.1/17.2%. As the mass spectrum and thin layer chromatogram show, the product is mononitrile-free 1-amino-4-isopropyl-amino-2,3-dicyano-anthraquinone.

EXAMPLE 9

A mixture of 17.7 g of sodium 1-amino-4-methylamino-anthraquinone-2-sulphonate, 4.1 g of dry sodium acetate, 11.25 g of dry sodium 3-nitrobenzenesulphonate, 7.35 g of sodium cyanide and 120 ccs of formamide is heated to 80°-85° C., whilst stirring, until the starting material can no longer be detected by thin layer chromatography, that is to say for about 5 hours. The reaction mixture is diluted with 120 ccs of water, the precipitate is filtered off and the filter cake is washed with hot water until the runnings are colourless and dried at 60° C. Yield: 13.5 g, corresponding to 89.4% of theory, of a dark blue, crystalline product which, according to the mass spectrum and thin layer chromatogram, consists mainly of 1-amino-4-methylamino-2,3-dicyano-anthraquinone.

TABLE: EXAMPLES 10–17

By a procedure which corresponds exactly to that described in the preceding examples, the dinitriles (I) are obtained from the sulphonic acids (II), which are accessible from 1-amino-4-bromo-anthraquinone-2-sulphonic acid and the corresponding amine:

| Example No. | R | Yield (%) |
|---|---|---|
| 10 | CH₃–⟨H⟩ | 86.2 |

-continued

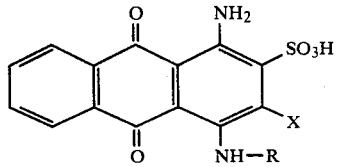

| Example No. | R | Yield (%) |
|---|---|---|
| 11 | -⟨H⟩-CH₃ (cyclohexyl-CH₃, methyl on ring carbon) | 87.4 |
| 12 | -⟨H⟩-CH₃ | 89.2 |
| 13 | -⟨H⟩ with three CH₃ groups | 76.5 |
| 14 | —(CH₂)₃—CH₃ | 75.9 |
| 15 | —(CH₂)₂—OCH₃ | 82.0 |
| 16 | —(CH₂)₃—OC₂H₅ | 79.5 |
| 17 | —(CH₂)₅—CH₃ | 87.2 |

The following dinitriles can also be prepared with similarly good yields: 1-amino-4-(2-butoxy-ethylamino)-2,3-dicyano-anthraquinone, 1-amino-4-(4-methoxybutylamino)-2,3-dicyano-anthraquinone, 1-amino-4-(5-ethoxy-pentylamino)-2,3-dicyano-anthraquinone and 1-amino-4-[2-(2-hydroxy-ethoxy)-ethylamino]-2,3-dicyanoanthraquinone.

We claim:

1. Process for the preparation of 2,3-dicyanoanthraquinones of the formula

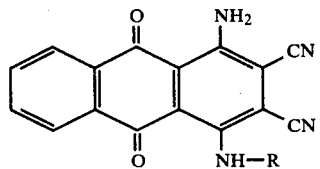

wherein
R denotes hydrogen, optionally substituted alkyl or optionally substituted cycloalkyl,
by reacting sulphonic acids of the formula or salts thereof,
wherein
R has the abovementioned meaning and
X denotes hydrogen or the sulphonic acid group, with compounds which donate cyanide ions, characterised in that the reaction is carried out in formamide or N-methyl-formamide.

2. Process according to claim 1, characterised in that the reaction is carried out in formamide.

3. Process according to claim 1, characterised in that the reaction is carried out in the presence of oxidising agents and if appropriate heavy metal catalysts and acid-binding agents.

4. Process according to claim 3, characterised in that air, oxygen, nitrobenzene or m-nitrobenzenesulphonic acid or salts thereof is used as the oxidising agent.

5. Process according to claim 3, characterised in that air, in the presence of heavy metal catalysts, such as vanadates, molybdates or copper salts, is used as the oxidising agent.

6. Process according to claim 1, characterised in that sodium cyanide or potassium cyanide is used as the compound which donates cyanide ions.

7. Process according to claim 1, characterised in that 1-amino-4-alkylamino-, 1-amino-4-cycloalkylamino- or 1,4-diamino-anthraquinone-2-sulphonic acids or salts thereof are employed as the sulphonic acids.

8. Process according to claim 1, characterised in that 1,4-diamino-anthraquinone-2-sulphonic acid or a salt thereof is employed as the sulphonic acid.

9. Process according to claim 1, characterised in that 1,4-diamino-anthraquinone-2,3-disulphonic acid or a salt thereof is employed as the sulphonic acid.

10. Dicyano-anthraquinone dyestuffs of the formula given in claim 1, wherein R denotes an optionally substituted cycloalkyl radical.

* * * * *